(12) United States Patent
Banks et al.

(10) Patent No.: US 7,886,022 B2
(45) Date of Patent: Feb. 8, 2011

(54) REDUCING CONTENTION IN AN ENVIRONMENT USING OPTIMISTIC LOCKS

(75) Inventors: Andrew David James Banks, Romsey (GB); Michael Cobbett, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 1594 days.

(21) Appl. No.: 11/156,401

(22) Filed: Jun. 20, 2005

(65) Prior Publication Data

US 2006/0031360 A1 Feb. 9, 2006

(30) Foreign Application Priority Data

Jun. 26, 2004 (GB) ................... 0414293.1

(51) Int. Cl.
*G06F 15/16* (2006.01)
(52) U.S. Cl. .................. 709/218; 709/201; 709/203; 709/209; 709/217; 710/110; 712/31; 340/825
(58) Field of Classification Search .............. 709/201, 709/218, 248, 203, 208, 209, 217; 340/825; 710/110; 712/31; 700/3
See application file for complete search history.

(56) References Cited

U.S. PATENT DOCUMENTS

| | | | | |
|---|---|---|---|---|
| 5,526,492 A * | 6/1996 | Ishida | .......... | 709/228 |
| 5,551,047 A * | 8/1996 | Mori et al. | .......... | 712/28 |
| 5,621,798 A * | 4/1997 | Aucsmith | .......... | 380/271 |
| 5,649,090 A * | 7/1997 | Edwards et al. | .......... | 714/10 |
| 6,065,037 A * | 5/2000 | Hitz et al. | .......... | 709/200 |
| 6,067,580 A * | 5/2000 | Aman et al. | .......... | 719/330 |
| 6,269,391 B1 * | 7/2001 | Gillespie | .......... | 718/100 |
| 6,356,956 B1 * | 3/2002 | Deo et al. | .......... | 719/318 |
| 6,539,445 B1 * | 3/2003 | Krum | .......... | 710/110 |
| 6,711,607 B1 * | 3/2004 | Goyal | .......... | 709/203 |
| 6,823,473 B2 * | 11/2004 | Mukherjee | .......... | 714/10 |
| 6,865,596 B1 * | 3/2005 | Barber et al. | .......... | 709/208 |
| 7,461,130 B1 * | 12/2008 | AbdelAziz et al. | .......... | 709/208 |
| 2002/0194300 A1 * | 12/2002 | Lin et al. | .......... | 709/217 |
| 2003/0182464 A1 * | 9/2003 | Hamilton et al. | .......... | 709/314 |
| 2004/0019771 A1 * | 1/2004 | Quach | .......... | 712/229 |
| 2005/0015508 A1 * | 1/2005 | Hankejh et al. | .......... | 709/230 |
| 2007/0078768 A1 * | 4/2007 | Dawson | .......... | 705/50 |

OTHER PUBLICATIONS

Message duplication in RVCM DQ: http://eai.ittoolbox.com/groups/groups.asp?v=TIBCO-L&i=436532.
ChurchillObjects.com—Networking With TIBCO Rendezvous—Distributed Queues: http://www.churchillobjects.com/c/00128j.html.
ChurchillObjects.com—Networking With TIBCO Rendezvous—Fault-Tolerance: http://www.churchillobjects.com/c/11028k.html.

* cited by examiner

*Primary Examiner*—Thu Ha T Nguyen
(74) *Attorney, Agent, or Firm*—Scott D. Paul, Esq.; Carey Rodriguez Greenberg Paul, LLP (57) ABSTRACT

Contention in a distributed processor computer system with a replicated message environment is reduced. The system comprises processor consumers intercommunicating via a server interface that receives a message from a producer. The server favors one consumer, marks the message accordingly, communicates the marked message to the system, and delays the processing in another consumer beyond a predetermined time, for example the time normally taken to process a message.

20 Claims, 5 Drawing Sheets

REDUCING CONTENTION IN AN ENVIRONMENT USING OPTIMISTIC LOCKS

BACKGROUND OF THE INVENTION

The present invention relates to distributed processing computer systems, and more particularly to distributed processing computer systems using optimistic locks.

In multiple processor computer systems, processors communicate with each other with messages. Messages are sent via servers to request or transmit information. The server interface often consists of a middleware application such as replicated message systems. Optimistic locks may be used at the processor, or "client", which become classical contended locks at the server. An optimistic lock may be rejected by the server causing the client and server to process and transmit additional data. Optimistic lock strategies generally work well where there is little likelihood of contention between competing processors, or clients, processing the messages.

For example, multiple consumers are able to process a message sent from another client that produces the message via the server. Each client processes the message under the optimistic lock strategy. In replicated message systems, the results from each client are transmitted across a network and received by the server. The server applies and distributes the first set of results, while any subsequent result relating to the same message is rejected. This is a common situation in an application server configuration where different threads of control are executing concurrently in the same operating system, such as executing competing clients that are draining a message queue. In the classic approach, each client takes contended hard locks on the messages and then processes each message.

A solution by Tibco Software Inc. of Palo Alto, Calif., United States of America, follows an approach of having clients publish messages, and a separate server to nominate which client to process a given message. In the Tibco approach, the originating client publishes the message. A second server then nominates which client is to process the message. A replicated message system server then distributes the message. Once a client is nominated in the Tibco approach, no other client can process the message before a time delay set by the server.

BRIEF SUMMARY OF THE INVENTION

According to a first aspect of the present invention, a method for message distribution in a multiple processor system comprises generating a message in a producer processor for processing by a consumer processor, nominating the consumer processor to process the message based on predetermined criteria, encoding the message with a first indication of the nominated consumer processor, and communicating the message with the indication of the nominated consumer processor to each processor in the multiple processor system.

According to another aspect of the present invention, a system for message distribution in a multiple processor system comprises a producer processor for generating a message for processing by a consumer processor and a message manager. The message manager receives the message generated by the producer processor, nominates the consumer processor to process the message based on predetermined criteria, encodes the message with a first indication of the nominated consumer processor, and communicates the message with the indication of the nominated consumer processor to each processor in the multiple processor system.

According to yet another aspect of the present invention, a computer program product comprises a computer usable medium having computer usable program code embodied therein for message distribution in a multiple processor system. The computer usable medium program code comprises computer usable program code for generating a message in a producer processor for processing by a consumer processor, computer usable program code for nominating the consumer processor to process the message based on predetermined criteria, computer usable program code for encoding the message with a first indication of the nominated consumer processor, and computer usable program code for communicating the message with the indication of the nominated consumer processor to each processor in the multiple processor system.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
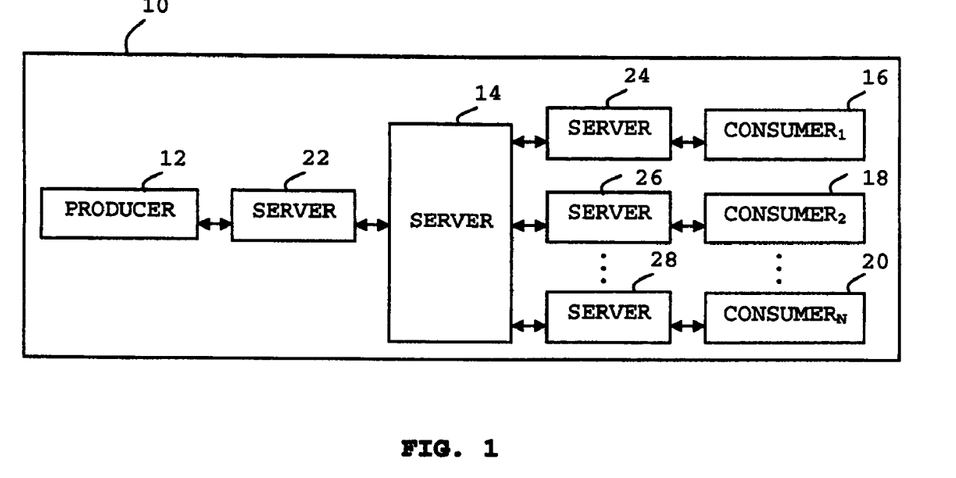
FIG. 1 illustrates a computer that may be used to implement an aspect of the invention.

FIG. 1 shows a computer 10 in accordance with an aspect of the invention having servers 22,24,26,28 each connected to a client entity, for example producer 12 or consumers 16,18, 20. An application or client entity that produces a message is a "producer" 12. All other applications or client entities in the system are "consumers" 16,18,20 and are potential candidates to process a message deriving from the producer. Each server may be interconnected or communicate via server 14. It will be appreciated that a replicated message system is not essential. Any system that allows optimistic updates may suffice. Also, the system may be configured to allow multiple conflicting updates and notify their occurrence to the user rather than correcting the conflicts. The producer communicates via the consumers with messages. The messages may request or provide information. For illustrative purposes, one producer or consumer is shown with a respective server. Of course, it will be appreciated, any number of consumers and servers may be implemented in computer system 10. For example, each server may be configured with multiple consumers or producers.

In an implementation, a producer 12 produces a message and communicates the message to the producer server 22 for distribution, for example via server 14, to other servers 24,26, 28 and consumers 16,18,20. The producer server 22 nominates a consumer to process the message, and the message is sent from the producer server to the respective server of the nominated consumer. The chosen server may then use any locking approach to communicate the message to the target consumer of the chosen server. For example, a classical non-optimistic lock approach may be implemented since all of the processing of the message is local to the chosen server.

Figure 2:
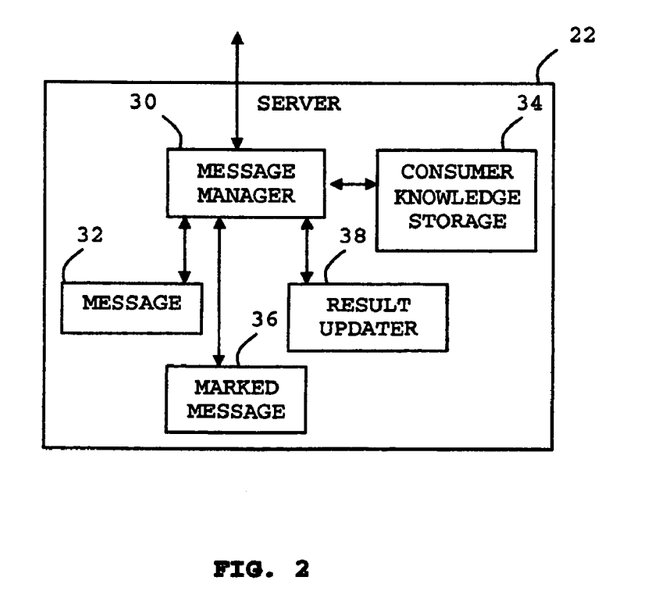
FIG. 2 illustrates a server of the computer of FIG. 1 in accordance with an aspect of the invention.

FIG. 2 shows an embodiment of the producer server 22 of FIG. 1 in more detail. The server receives and sends messages via an interface represented by message manager 30. The message manager receives an incoming message received from the producer 12 and stores the message in a memory storage or database 32. The message manager then nominates a desired consumer 16,18,20 to process the message. The message manager in this configuration nominates the server associated with the desired consumer. Another configuration may directly nominate a consumer, however, knowledge of each of the individual consumers which changes rapidly is required. The message manager may nominate a consumer on the basis of a predetermined criteria, which may be stored in consumer knowledge storage or database 34. The selection process or the predetermined criteria may be based on the chosen server having respective consumers capable of processing the message. It will be appreciated, however, any algorithm may be used, even random selection provides adequate results in this configuration. For example, the message manager may select a consumer based on a most favored consumer status. Other examples are that the message manager may have no knowledge of the consumers, and may select a consumer randomly or in some fair share manner, or the like. The consumer knowledge may detail consumer capabilities to process the message, and the message manager may select a consumer on this basis. Of course, other predetermined criteria may be envisaged.

The message manager 30 selects a consumer, and sends the message with an indication of the respective nominated server. For example the message may be marked or encoded with the details of the nominated consumer and stores the marked message in storage or database 36. The message is distributed to the nominated consumer, for example via server 14. The nominated consumer processes the message and returns the processed message to the server 14 for updating in result updater 38 and distribution to the system 10. It will be appreciated that any server associated with a consumer shown 24,26,28,54,54N may be a configured as shown in FIG. 2 should any consumer 16,18,20,56,56N shown in FIG. 1 or 3 become a producer for another message produced at a another time.

Figure 3:
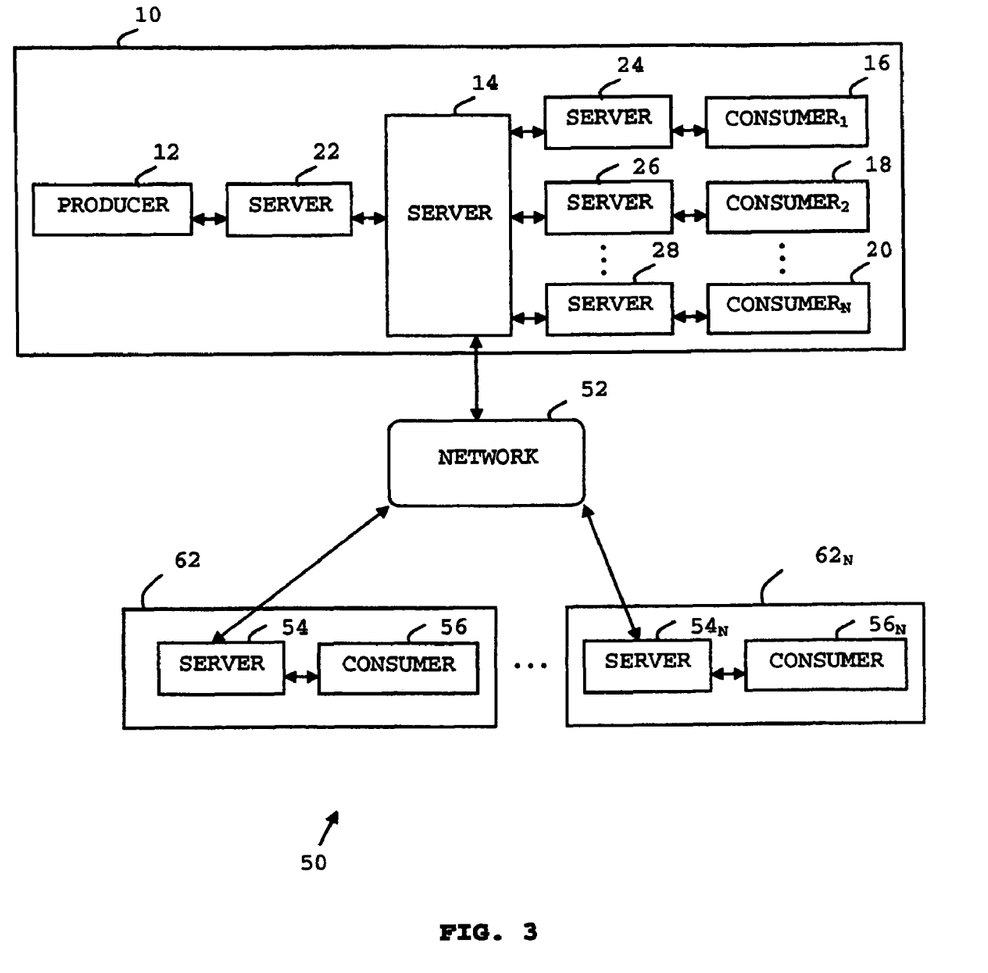
FIG. 3 illustrates a computer network system in accordance with an aspect of the invention.

FIG. 3 shows an aspect of the invention implemented in a distributed computer system 50, configured with multiple computers 10,62,62N. The computers 62,62N shown are similar to computer 10 of FIG. 1, however, for illustrative purposes the producer 12 is only shown in computer 10. It will be appreciated that any consumer shown 16,18,20,56,56N may be a producer for another message produced at a another time, and likewise producer 12 may become a consumer for another message produced at another time. Each server 22,24,

26,28,54,54N are interconnected via network 52. The network may be a network such as the Internet, wide area TCP/IP networks, or the like. Each server 22,24,26,28,54,54N may also be interconnected via a master server shown as server 14 via network 52. In an embodiment, the master server is a special server on the network which resolves any conflicts, for example where two consumers that may be attached to two servers attempt to process the same message. Any server 22,24,26,28,54,54N may act as the master server, and there is only one master server for each process. With this configuration, the master server starts with latest version of the data, in other words the server does not start with a partial view. Once a master server is elected, all other servers agree to the election of a single master server. In replication schemes, there may be a master copy of the data from which the replicas are made. In an embodiment, the master server also plays a second role in arbitrating the conflicting updates.

Figure 4A:
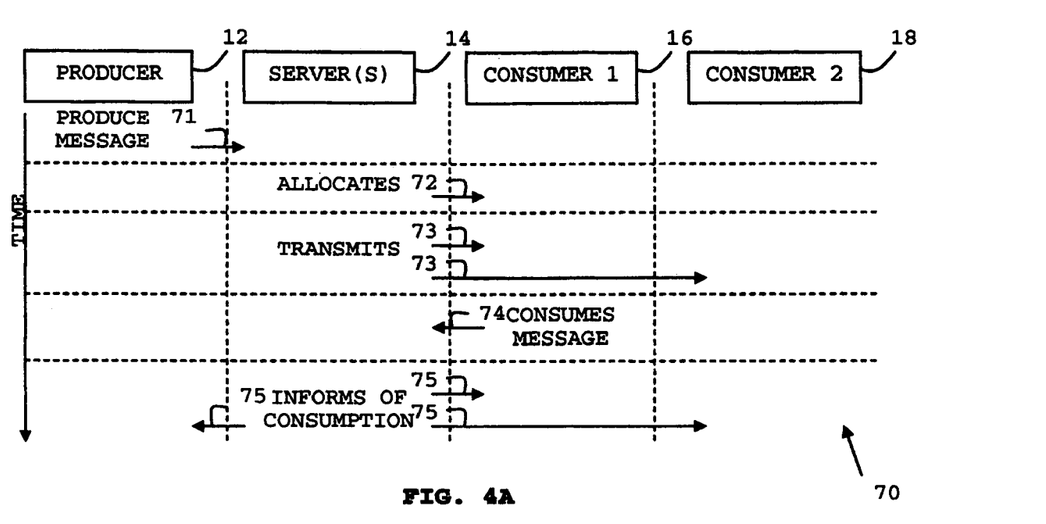
FIGS. 4A-C illustrate timelines of processing in accordance with an aspect of the invention.
Figure 4B:
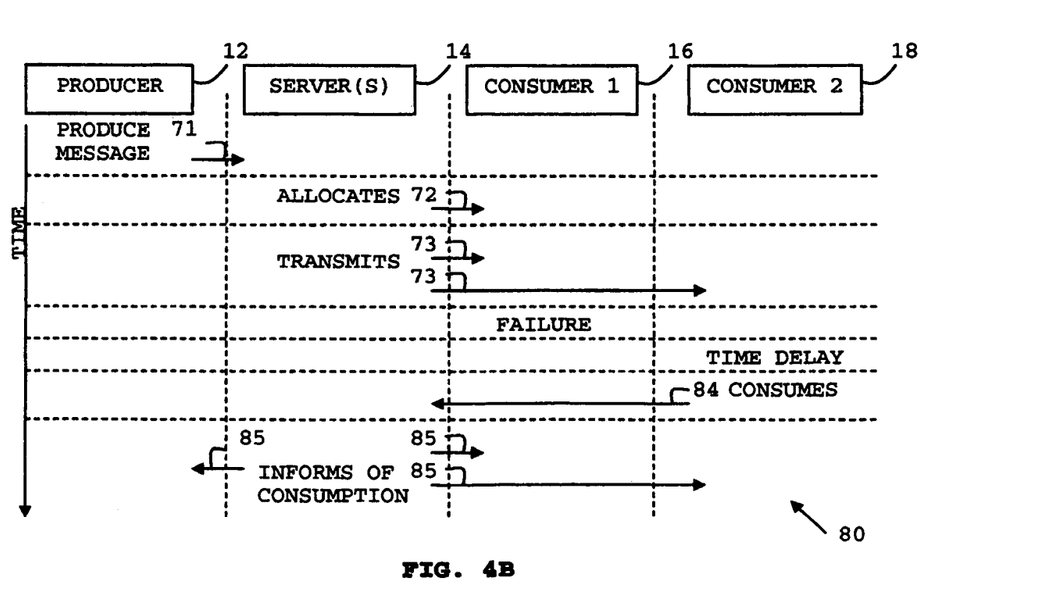
Figure 4C:
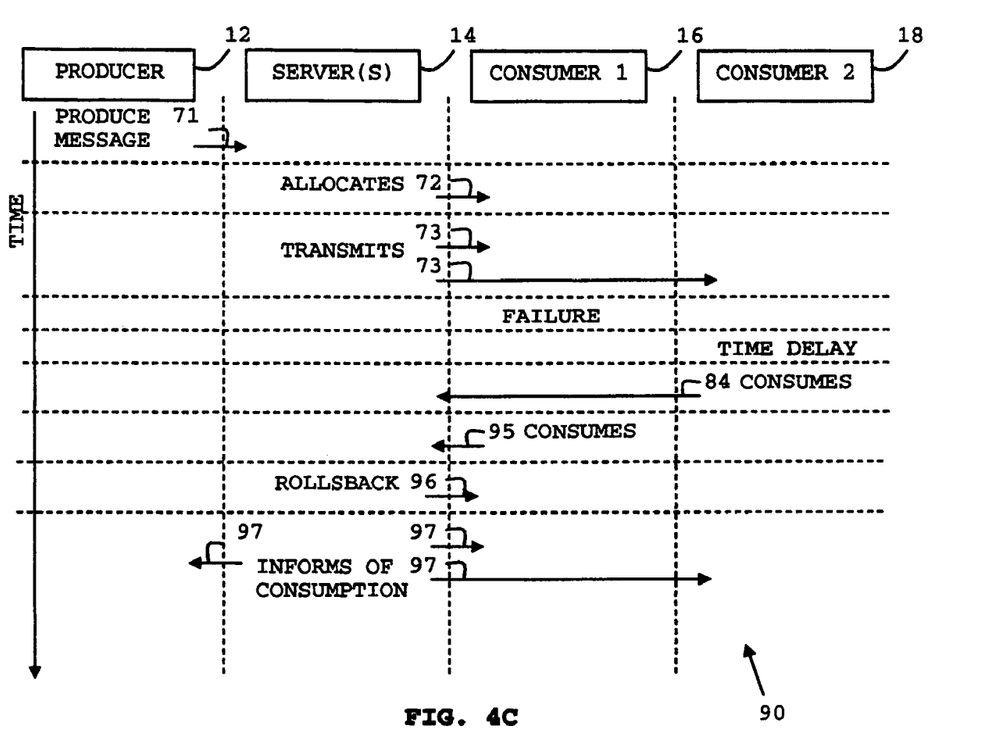
Figure 5:
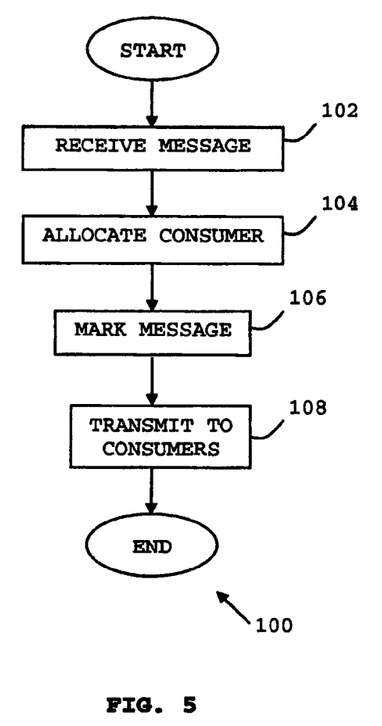
FIGS. 5 and 6 illustrate methods in accordance with aspects of the invention.

FIGS. 4A-C show timelines of processing of the method shown in FIG. 5. FIG. 4A shows a timeline of processing with no failure, FIG. 4B shows a timeline of processing with failure of consumer 1, and FIG. 4C shows a timeline of processing with delay of consumer 1. The method 100 shown in FIGS. 5 and 6 is discussed with reference to the timelines of FIGS. 4A-C.

Figure 6:
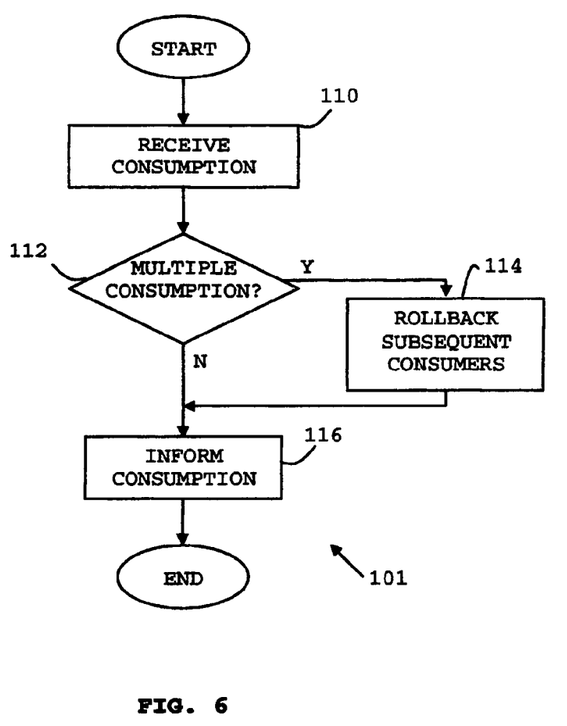

The method 100 shown in FIG. 5 concerns the distribution of messages, and the method 101 shown in FIG. 6 concerns the consumption of messages. The method in FIG. 5 receives 71 at the server 22 a message 102 to be distributed that was provided by producer 12. The message manager 30 of the server 22 allocates a consumer 104 as consumer 1, 72. The message manager marks or encodes the message 106 with a tag that is an indicator of where the message is to be sent 73 to be processed. The message is sent to all of the servers marked (for example, "INITIAL CONSUMER=ServeridXXX") to indicate that a consumer at the server identified (for example, "ServeridXXX") should be given the first opportunity to process the message.

The allocation process is based on a predetermined criteria, as discussed. The message is then sent 108 to all consumers. The message may also be sent to the server sending the message, which would usually involve a producer and a consumer co-located at the same server. The message is marked with the identity of the consumer, or more likely the identity of the server hosting the consumer. In another embodiment, the message may be marked with a predetermined time delay during which the server will favor the allocated consumer. If the allocated consumer does not process the message within the time delay, then other consumers at other servers may process the message. The time delay is configured by an administrator (not shown) in the server. The administrator adjusts the length of the time delay based on a compromise between: a) the time typically taken to allow a consumer at a nominated server to receive a copy of the message, process the message, and deliver the result to other servers; and b) the time end users of the system notice if a failure to process the message occurs in the nominated server.

The allocated consumer receives the message, and upon receipt processes the message, if possible, and makes other updates to other resources the allocated consumer owns. The other resources the allocated consumer owns may be data on a disk, for example, adding an amount to a bank account and writing the new balance to a database stored on a disk, or the like. The allocated or favored consumer replicates the intended results to the server, and if the server sees no conflicting updates, such as any attempts to consume the same message, the server makes the consumption, i.e. the changes made by the allocated consumer, durable. Copies of the results and updates are sent to all the consumers including the producer and all the consumers. The other consumers, i.e. the non-allocated consumers, do not become consumers until the time delay has expired and the server has not informed the consumers of a consumption. If several consumers attempt to process the message, possibly including the favored consumer after the time delay has expired, for example, the server arbitrates as to which set of updates that the server actually accepts. In an embodiment, the first set of results received are accepted, and all subsequent results are rolled back by the consumer that processed the respective subsequent results.

In an embodiment, the server may delay replication of the original message to all consumers except the favored consumer. This results in reduction of the network load in some configurations, such as wide area TCP/IP networks. If the favored consumer fails completely or is unable to process the message in less than the time allowed by the server, then another consumer can become a consumer to process the message once that consumer has received the message. If the server delays replicating the messages to non-favored consumers, alternative servers 14,54,54N may be run to avoid a situation where a message is delayed in the server and the server crashes. With this configuration, processing depends upon the server eliminating multiple consumers attempting to process the message, which may be managed by detecting multiple attempts to consume the message. For example, eliminating multiple consumers attempting to process the same message may be achieved by a non-optimistic lock strategy held inside the memory of a single computer, which consequently, may not be expanded beyond the size of the single computer.

In FIG. 4A, the allocated consumer, consumer 1, duly processes the message and informs the server 74. The server receives the result of the consumption 110 and process of the message. The consumer 2 does not consume the message, and therefore there are no multiple consumptions 112. The server informs 116 and updates the system of the result 75. In this scenario, the process is completed with no failure of consumer 1.

In FIG. 4B, after the message has been sent to all consumers 108, consumer 1 fails before consumer 1 processes the message. After a predetermined delay consumer 2 has not received an indication from the server that the message has been consumed. Consumer 2 then consumes the message 84, and informs the server. The server then informs the consumption to the system 85, including consumer 1 when consumer 1 recovers.

In FIG. 4C, after the message has been sent to all consumers 108, a delay in processing is experienced in consumer 1, which is equal to the self imposed delay in consumer 2. In this event, both consumer 1 and consumer 2 process and consume the message 95,84, respectively. Both inform the server of the respective consumptions, and the server receives multiple consumptions 112. The server rollsback 96 the subsequent consumer consumption 114, in this case consumer 1. The server, which may be the master server, informs 97 the consumption 116 to the system, including consumer 1. In another embodiment, the acting master server arbitrates as to which consumption is allowed to proceed. The decided consumption is made durable and distributed. The server also instructs consumer 1 to roll back the consumption and all other updates which are part of the same unit of work.

In another embodiment the server does not specify a time interval during which the nominated consumer processes the message. Instead, after some time the server removes the marked message from the queue and replaces the marked message with the original message with a different mark nominating a different consumer for processing. The replication server eliminates the possibility that the server attempts to remove the message clashes with the attempt of the first consumer to process the first marked message.

In another embodiment, the server which distributes the messages also nominates the consumer to process the message, which by making certain that the service to distribute messages is sufficiently available, the choice of preferred consumer is also sufficiently available.

If the nominated consumer fails to process the message, then any other consumer may process the message. The server 14 has the ability to detect the duplicate update attempts in order to eliminate the possibility that a message is processed twice. This configuration is not vulnerable to a consumer being allocated a message to process and then failing prior to processing.

The flowchart and block diagrams of the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

What is claimed is:

1. A method for message distribution in a multiple processor system having multiple processors, comprising:
   generating a message in a producer processor;
   nominating only a single consumer processor from the multiple processors to process the message based on predetermined criteria;
   encoding the message with a first indication of the nominated consumer processor;
   communicating the message with the indication of the nominated consumer processor to all of the processors in the multiple processor system;
   removing the message having the first indication upon not received a notice of consumption within a predetermined period of time;
   nominating another consumer processor to process the message; and
   encoding the original message, without the first indication, with another indication of the another nominated consumer processor.

2. The method of claim 1 further comprising
   encoding the message with a second indication of a predetermined time delay for a non-nominated consumer processor to process the message upon a notice of consumption of the message not being received within the predetermined time delay.

3. The method of claim 1 further comprising
   communicating a notice of consumption to all of the processors in the multiple processor system upon the message being processed.

4. The method of claim 3 further comprising
   arbitrating between at least two notices of consumptions, and selecting a consumption to be made durable.

5. The method of claim 4 further comprising
   instructing the consumer processor with the consumption not made durable to roll back.

6. The method of claim 4 wherein
   the nominating the consumer processor and arbitrating between at least two notices of consumptions is conducted by a master server.

7. The method of claim 1 wherein
   the nominating the consumer processor is based on a desired consumer processor basis.

8. A system for message distribution in a multiple processor system having multiple processors, comprising:
   a producer processor for generating a message; and
   a message manager configured to
   receive the message generated by the producer processor,
   nominate only a single consumer processor to process the message based on predetermined criteria, and
   encode the message with a first indication of the nominated consumer processor;
   communicate the message with the indication of the nominated consumer processor to all of the processors in the multiple processor system,
   remove the message having the first indication upon not received a notice of consumption within a predetermined period of time,
   nominate another consumer processor to process the message, and
   encode the original message, without the first indication, with another indication of the another nominated consumer processor.

9. The system of claim 8 wherein
   the message manager encodes the message with a second indication of a predetermined time delay for an un-nominated consumer processor to process the message upon a notice of consumption of the message not being received within the predetermined time delay.

10. The system of claim 8 wherein
    the consumer processor that processes the message communicates a notice of consumption to all of the processors in the multiple processor system upon the message being processed.

11. The system of claim 10 further comprises
    a master server for arbitrating between at least two notices of consumptions, and selecting a consumption to be made durable.

12. The system of claim 11 wherein
    the master server instructs the consumer processor with the consumption not made durable to roll back.

13. The system of claim 8 wherein
the message manager nominates the consumer processor is based on a desired consumer processor basis.

14. A computer-readable storage medium comprising computer-readable instructions embodied therein for message distribution in a multiple processor system having multiple processors, the computer-readable instructions, when executed by a message distribution system, causing the message distribution system to perform:
generating a message in a producer processor;
nominating only a single consumer processor from the multiple processors to process the message based on predetermined criteria;
encoding the message with a first indication of the nominated consumer processor;
communicating the message with the indication of the nominated consumer processor to all of the processors in the multiple processor system;
removing the message having the first indication upon not received a notice of consumption within a predetermined period of time;
nominating another consumer processor to process the message; and
encoding the original message, without the first indication, with another indication of the another nominated consumer processor.

15. The computer-readable storage medium of claim 14 further comprising
encoding the message with a second indication of a predetermined time delay for a non-nominated consumer processor to process the message upon a notice of consumption of the message not being received within the predetermined time delay.

16. The computer-readable storage medium of claim 14 further comprising
communicating a notice of consumption to all of the processors in the multiple processor system upon the message being processed.

17. The computer-readable storage medium of claim 16 further comprising
arbitrating between at least two notices of consumptions, and selecting a consumption to be made durable.

18. The computer-readable storage medium of claim 17 further comprising
instructing the consumer processor with the consumption not made durable to roll back.

19. The computer-readable storage medium of claim 17 wherein
the nominating the consumer processor and arbitrating between at least two notices of consumptions is conducted by a master server.

20. The computer-readable storage medium of claim 14 wherein
the nominating the consumer processor is based on a desired consumer processor basis.

* * * * *